(12) United States Patent
Junca et al.

(10) Patent No.: US 8,151,918 B2
(45) Date of Patent: Apr. 10, 2012

(54) METHOD FOR CONTROLLING ENERGY IN THE TRACTION CHAIN OF A HYBRID VEHICLE AND HYBRID VEHICLE

(75) Inventors: Carlos Junca, Paris (FR); Vincent Mulot, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 453 days.

(21) Appl. No.: 12/447,440

(22) PCT Filed: Oct. 8, 2007

(86) PCT No.: PCT/FR2007/052089
§ 371 (c)(1),
(2), (4) Date: Apr. 27, 2009

(87) PCT Pub. No.: WO2008/053107
PCT Pub. Date: May 8, 2008

(65) Prior Publication Data
US 2010/0051366 A1  Mar. 4, 2010

(30) Foreign Application Priority Data
Oct. 27, 2006  (FR) ..................... 06 54590

(51) Int. Cl.
*B60K 6/24* (2007.10)
(52) U.S. Cl. .................... 180/65.28; 903/930
(58) Field of Classification Search ......... 180/65.21, 180/65.22, 65.265, 65.28, 65.29; 903/905, 903/930; 477/2, 3
See application file for complete search history.

(56) References Cited

U.S. PATENT DOCUMENTS

| | | | |
|---|---|---|---|
| 5,722,911 A * | 3/1998 | Ibaraki et al. | ............... 477/3 |
| 5,789,882 A | 8/1998 | Ibaraki et al. | |
| 5,841,201 A * | 11/1998 | Tabata et al. | ........... 290/40 C |
| 6,116,363 A | 9/2000 | Frank | |
| 6,201,312 B1 | 3/2001 | Shioiri et al. | |
| 6,480,767 B2 * | 11/2002 | Yamaguchi et al. | ......... 701/22 |
| 2002/0062183 A1 * | 5/2002 | Yamaguchi et al. | ......... 701/22 |
| 2002/0107618 A1 | 8/2002 | Deguchi et al. | |
| 2003/0217876 A1 | 11/2003 | Severinsky et al. | |
| 2007/0251741 A1 * | 11/2007 | Kidston et al. | ........... 180/65.2 |

OTHER PUBLICATIONS

International Search Report mailed Apr. 16, 2008 in PCT/FR2007/052089.

* cited by examiner

*Primary Examiner* — Frank Vanaman
(74) *Attorney, Agent, or Firm* — Nicholas E. Seckel

(57) ABSTRACT

The method includes, during a first step (8) determining in real time the fuel consumption gain of the thermal engine by defining the difference between the consumption of the thermal engine in operation and the consumption of the thermal engine when stopped independently from other energy sources outside the thermal engine, the equivalent consumption being calculated from a predetermined coefficient corresponding to the ratio between a consumption difference and an engine power difference for a given engine speed; during a second step (9), deciding to switch on or switch off the thermal engine according to a criterion and to the consumption gain, the criterion depending on the recovery level of the electric energy recovering means and being determined in order to increase the use of the electric energy storage means and to switch off the thermal engine as often as possible.

12 Claims, 5 Drawing Sheets

ND FOR CONTROLLING ENERGY IN
METHOD FOR CONTROLLING ENERGY IN THE TRACTION CHAIN OF A HYBRID VEHICLE AND HYBRID VEHICLE

BACKGROUND ART

The invention relates to strategies for managing the energy sources involved in powering (combustion/electric) hybrid vehicles.

More particularly, it relates to an energy management method for a hybrid vehicle drive system, the purpose of which is to minimize fuel consumption and preserve the useful life of the electrical energy storage means.

A hybrid drive system is schematically illustrated in FIG. 1.

Such a drive system typically comprises a heat engine 1 supplying mechanical energy to the vehicle drive wheels 2 (just one wheel is shown), one or more electric machines 3 (just one electric machine is shown) supplying electrical energy to the vehicle wheels 2, means for storing electrical energy 4, means 5 for transmitting mechanical and electrical energy to the vehicle wheels 2, and electrical energy recovery means 7 shown enclosed by a dashed line.

One of the possible energy recovery means, also described as "natural", is for example to use the electric machine as a current generator during deceleration. Operating as a generator, the electric machine transforms the mechanical/kinetic energy from the wheels into electrical energy.

Control of a hybrid vehicle drive system as described above is known, in particular from document EP0759370, and this control comprises selection of the drive mode (combustion/electric) according to the efficiency of the electric drive mode.

According to this document, two values of a physical quantity are compared in order to select the drive mode so as to optimize fuel consumption. Therefore, the fuel consumption must be known continually.

In this document, the fuel consumption of the heat engine is calculated from the average efficiency of the heat engine, which is determined empirically from a driving history.

Using the engine efficiency to calculate the fuel consumption of the heat engine yields imprecise results, since the efficiency value includes losses related to engine speed.

SUMMARY OF THE INVENTION

The method according to the invention aims in particular to remedy this disadvantage by proposing a solution that is both simpler and more precise.

In the invention, fuel consumption is calculated from a coefficient that corresponds to a characteristic of heat engines known as "marginal" consumption.

To this end, a first object of the invention is an energy management method for a hybrid vehicle drive system based on the kind of architecture seen in FIG. 1, said method consisting of:

in a first step, determining the fuel consumption gain of the heat engine in real time by figuring the difference between the fuel consumption with the heat engine on and the equivalent engine-off consumption, independently of other sources of energy outside the heat engine, the equivalent consumption being calculated from a set coefficient corresponding to the ratio between a difference in fuel consumption and a difference in engine power for a set engine speed; and in a second step deciding to turn the heat engine on or off based on a preset criterion and the consumption gain, with said criterion being dependent on the level of energy recovery of the electrical energy recovery means, and determined in such a way as to increase the use of the electrical energy storage means and turn off the heat engine as often as possible.

The method according to the invention also consists of, in an additional third step, making use of information on the state of charge of the electrical energy storage means in order to determine the heat engine power level needed to just meet the demand for power at the wheel when the decision has been made to turn the heat engine on.

Besides optimizing fuel consumption, the method according to the invention aims at preserving the useful life of the electrical energy storage means.

"Electrical energy storage means" is understood as any means having a storage capacity for electrical energy, such as a super capacitor or a storage battery, for example. In order to simplify the description, we will use the term "battery" to indicate the storage means.

Another object of the invention is a hybrid vehicle comprising a hybrid drive system of the type described above, and additionally comprising control means implementing the method according to the invention as defined above.

BRIEF DESCRIPTION OF THE DRAWINGS

Other characteristics and advantages of the present invention will appear in the following detailed description, referring to the attached drawings, which are given as a non-limiting example, and in which.

DETAILED DESCRIPTION OF PARTICULAR EMBODIMENTS

In the figures, the same references are used to designate the same elements.

Figure 1:
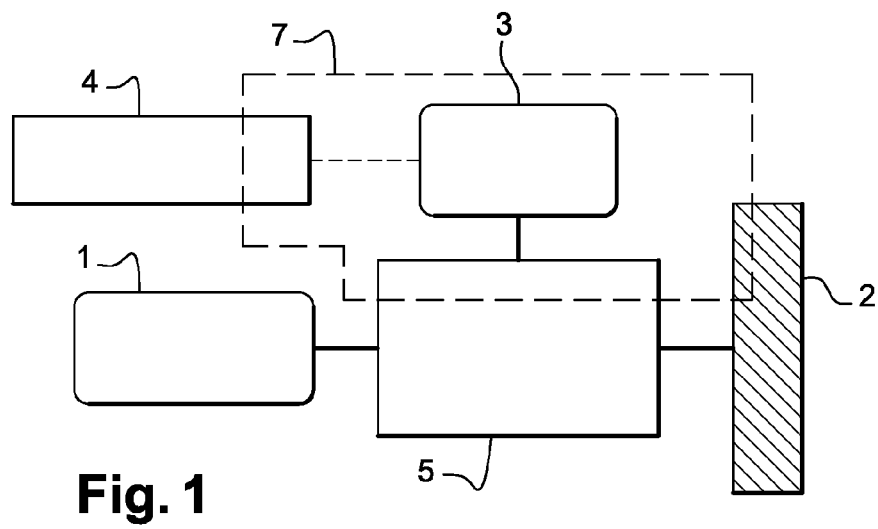
FIG. 1, already described, shows a simplified architecture of a hybrid drive system according to the state of the art.
Figure 2:
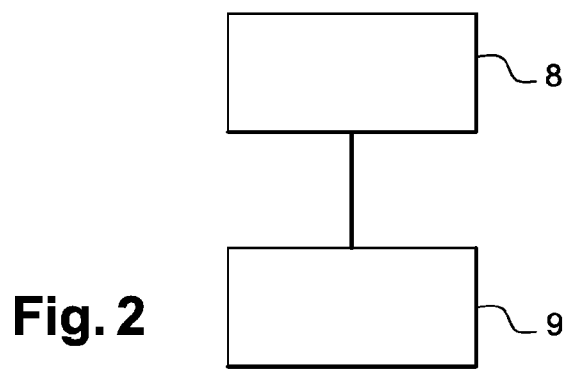
FIG. 2 shows a flow chart of the first two steps of the method according to the invention.

The method according to the invention is illustrated by the flowchart in FIG. 2.

It consists of, in a first step 8, determining the fuel consumption gain of the heat engine, and then, in a second step 9, deciding to turn the heat engine on or off based on a preset criterion and the fuel consumption gain.

Figure 3:
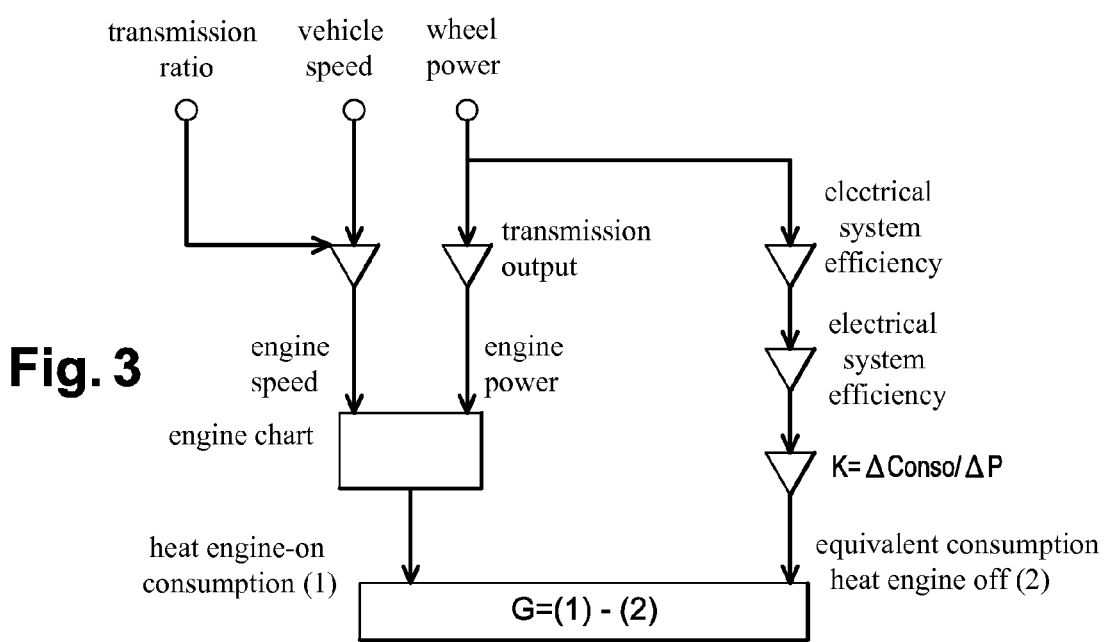
FIG. 3 shows a block diagram of the first step of the method according to the invention.

The first step 8 is illustrated by the block diagram in FIG. 3.

This first step is based on calculating the potential fuel consumption gain G associated with stopping the heat engine at a given moment of travel. Calculating this gain in real time and comparing the result of this calculation to a set coefficient determines whether the heat engine has to remain on or be turned off.

The way to calculate this gain G is described below.

In this first step 8, neither energy recovery nor energy sources outside the heat engine are considered. The only source of energy considered is that provided by the heat engine.

Figure 4:
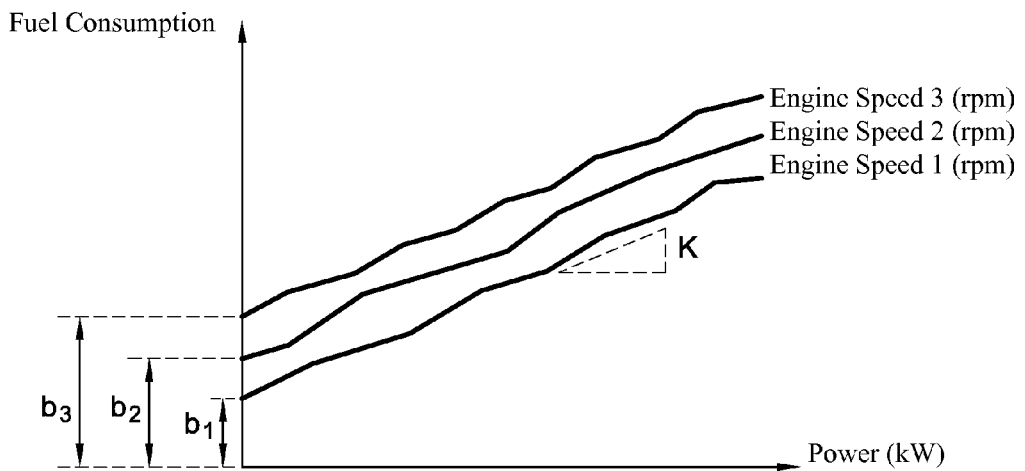
FIG. 4 shows a graph of the curves of engine speeds as a function of heat engine fuel consumption.

The heat engine fuel consumption at a given moment is determined from a chart of engine speed measurements that maps the engine fuel consumption as a function of engine power and speed. This kind of chart is illustrated in FIG. 4, which shows three engine speed curves 1, 2 and 3, respectively, expressed in revolutions/minute (rpm) on a coordinate system showing fuel consumption on the ordinate, expressed in grams/second (g/s), and power on the abscissa, expressed in kilowatts (kW). Power is the power needed at the wheel to provide drive power, aside from the transmission losses. Neither the transmission ratio (or engine speed) nor the vehicle speed are managed by the method according to the invention. It is assumed that they have been optimized beforehand to ensure overall vehicle performance (fuel consumption, comfort, performance).

Figure 5A:
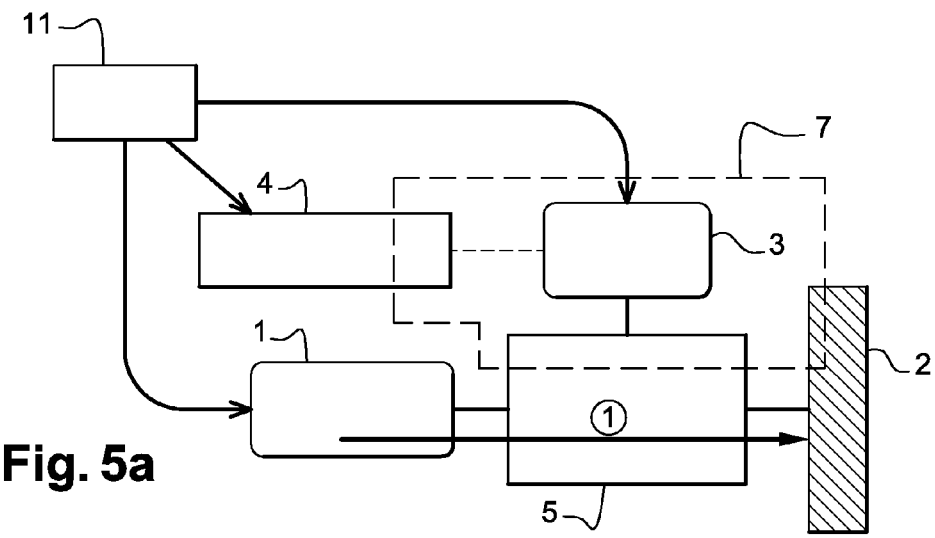
FIG. 5a shows the mechanical energy flow path with the heat engine turned on (path 1) for the first step of the method according to the invention.

FIG. 5a shows the mechanical energy flow path when the engine is on (path 1). Mechanical energy is transmitted directly to the wheels via the transmission means.

In this figure, and in the following figures illustrating the energy flow paths in the hybrid drive system, the recovery means 7 are shown enclosed within a dashed line. Also, a box 11 is used to represent the control means used by the method according to the invention to control the starting and stopping of the heat engine 1.

Equivalent fuel consumption with the heat engine turned off is estimated according to the following line of reasoning: when traveling in pure electric mode, the real consumption of the heat engine is zero, but the battery (the electric machine's power source) is losing its charge. This loss of charge is equal to the power needed at the wheel to provide drive power, aside from transmission losses. Since, in the end, the only energy source is the heat engine, and the battery just acts as a relay, this loss of charge in pure electric mode must be offset by subsequently recharging when the heat engine is turned back on. This is why the efficiency of the electrical system is represented twice in FIG. 3. Next, using the approximation that a power difference for the heat engine is proportional to the extra consumption incurred (cf. FIG. 4), equivalent consumption with the heat engine turned off is equal to the power at the wheel plus the losses in the electrical system during discharging and charging, multiplied by a proportionality coefficient K. In other words, the proportionality coefficient K is equal to the ratio between a difference in consumption and a difference in engine power for a set engine speed.

The properties of the heat engine impart a relative constancy to the coefficient K as a function of engine speed and torque. This constancy endows the strategy with precision and simplicity compared to using an average overall efficiency of the engine, which varies significantly as a function of engine speed and torque.

Figure 5B:
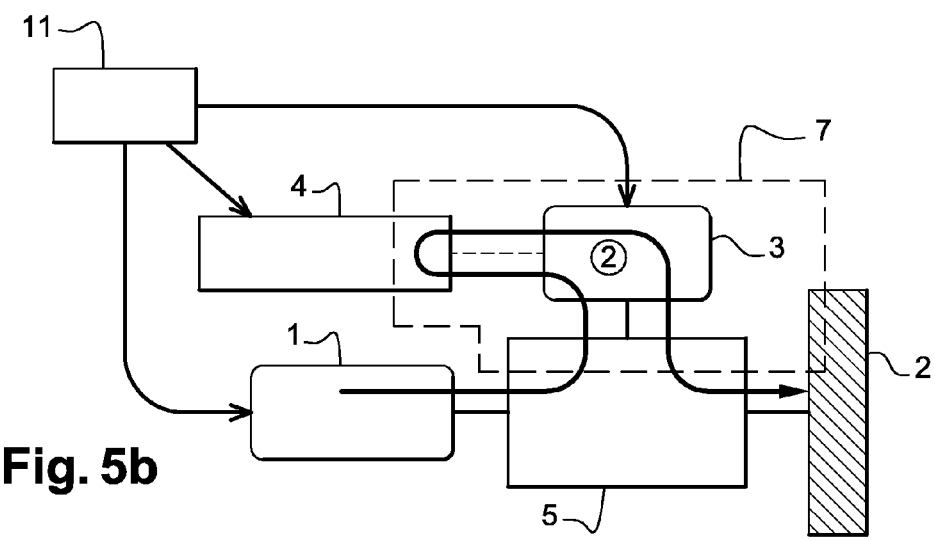
FIG. 5b shows the mechanical energy flow path with the heat engine turned off (path 2) for the first step of the method according to the invention.

FIG. 5b shows the energy flow path when the heat engine is off. The energy supplied by the heat engine passes through the electrical system. It is represented by a solid-line arrow (path 2).

Lastly, the fuel consumption gain G is determined from the difference between the two consumption results. If this gain G is positive, there is a decision to stop the heat engine.

An example is given non-exclusively below, in which a vehicle is traveling at a speed of 30 km/h for a period T (e.g., 100 seconds), and then at a speed of 100 km/h for the period T+1 (100 seconds). The question is whether to stop the heat engine during the period T or not. In order to simplify, the losses in the mechanical connection (gearbox) have been ignored.

a) If the heat engine remains on, the electric machine is not used, and fuel consumption is the same as that of a conventional vehicle.

b) If the heat engine is turned off during the period T, the vehicle fuel consumption during this period is zero, but the battery, which is providing the necessary power to keep the vehicle going, is discharging. In order to keep a constant level of charge in the battery, it must be recharged during the period T+1. The engine must then provide the necessary power to keep the vehicle going and recharge the battery at the same time.

When comparing the two fuel consumption rates a) and b), we observe a fuel consumption gain when the heat engine is turned off during the period T.

With the method according to the invention, this gain G can be estimated at any moment when we know the physical parameters of the heat engine: K and b (a function of the engine speed) and the average efficiency of the electrical system.

The gain G can be expressed with the following formula:

$G$=consumption in combustion mode−equivalent combustion in electrical mode or $$G = [Pmth \cdot K + b(Nmth)] - [Pmth \cdot K / \eta elec^2]$$

Where
Pmth=power provided by the heat engine
K=proportionality coefficient defined by predetermined graph of the heat engine
Nmth=heat engine speed
b=the part of fuel consumption that is solely dependent on the engine speed Nmth
$\eta$elec=electrical system efficiency Fuel consumption in combustion mode is expressed as the sum of the power provided by the heat engine, multiplied by the coefficient K, and the part of fuel consumption b dependent solely on the engine speed (cf. FIG. 4). To an engine speed RPM 1, 2, 3, . . . there corresponds a fuel consumption b1, 2, 3, . . . .

Figure 6:
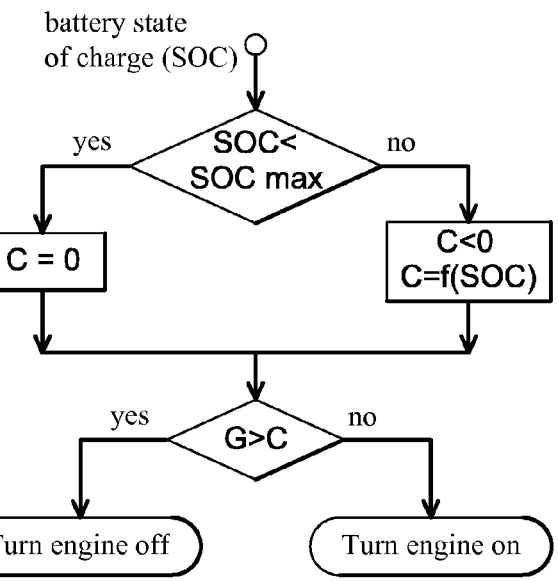
FIG. 6 shows a block diagram of the second step of the method according to the invention.

In the second step 9 of the method according to the invention, as illustrated by the block diagram in FIG. 6, the additional energy provided by the energy recovery means during deceleration or by any other onboard or external energy source is factored into the decision to stop/start the heat engine.

The energy recovered by the recovery means is used optimally to provide drive power in the heat engine-off phases. This energy is not used to assist the heat engine in providing power when it is on.

In a first management mode, the recovered energy is used in the engine-off drive phases, and the energy from the heat engine is used directly by the wheel in the engine-on phases.

This first management mode makes it possible to extend the useful life of the battery, in contrast to a management mode in which the battery is continually in use.

Figure 7A:
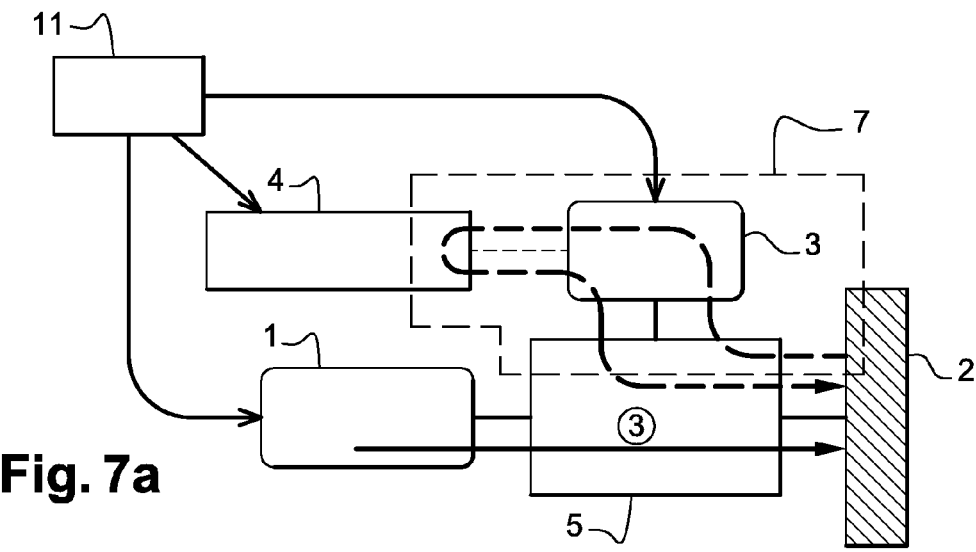
FIG. 7a shows the mechanical energy flow path with the heat engine turned on (path 3), taking into account the recovery of the additional energy with the heat engine turned off (path 3') for the second step of the method according to the invention.

The flow path for the energy provided directly by the heat engine to the wheels via the transmission means is represented in FIG. 7a by a solid-line arrow (path 3). The path for the energy recovered by the recovery means and sent to the wheels is represented by a dashed-line arrow (path 3').

In a second management mode, the energy recovered by the recovery means is used to assist the heat engine in the drive phases, and the energy needed to power the heat engine-stop phases is provided by the heat engine itself when it is on.

Figure 7B:
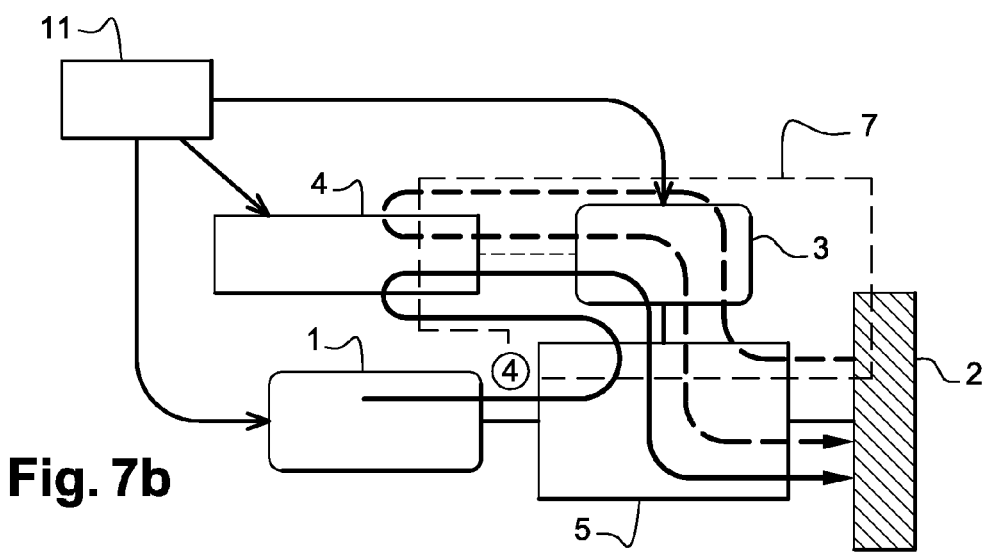
FIG. 7b shows the mechanical energy flow path (4), taking into account the recovery of the additional energy to assist the heat engine (path 4') for the second step of the method according to the invention.

The flow path for the energy supplied to the wheels by the heat engine assisted by the recovery means is represented in FIG. 7b (path 4) by a solid-line arrow. The flow path for the energy recovered by the recovery means and sent back to the wheels is represented by a dashed-line arrow (path 4').

The first management mode is thus favored over the second, given that in the second mode, losses in the electrical system are greater and therefore the battery is in greater use.

The method according to the invention determines the level of recovery for the recovery means from the state of charge of the battery. That is, when the state of charge of the battery is greater than a set high boundary (SOCmax) of the nominal operating range of the battery, a criterion C is used to determine whether to stop the heat engine. It is adjusted in real time in order to increase the use of the battery and turn the heat engine off as often as possible. In practice, the engine is allowed to stop when the gain G calculated in the first step is greater than the criterion C, with C becoming negative, and increasingly so, as a function of the state of charge.

Figure 8:
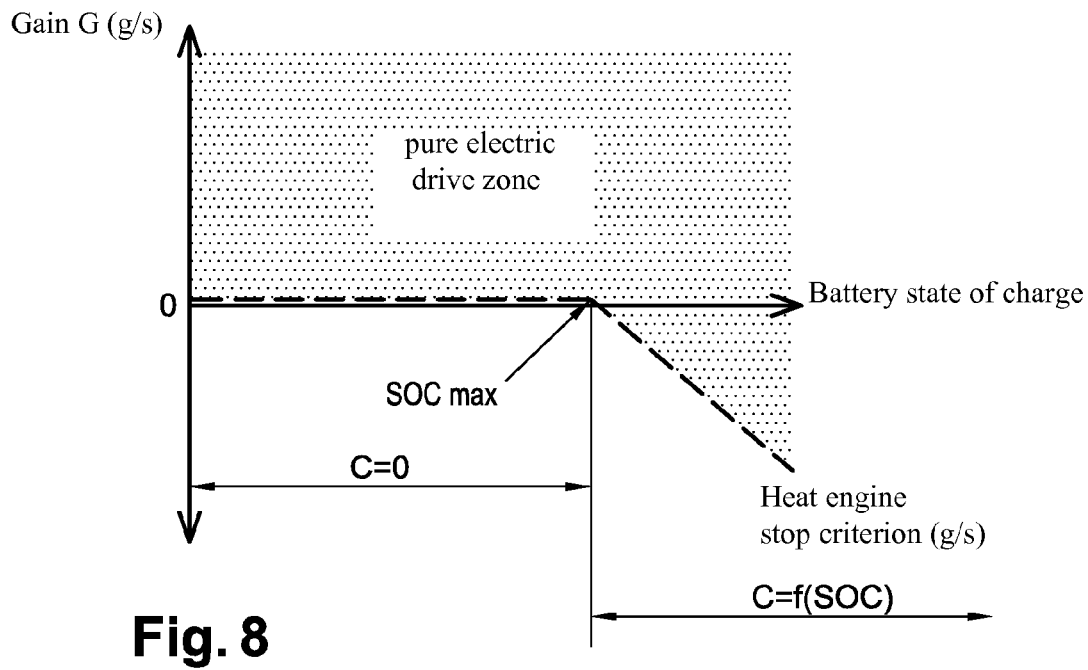
FIG. 8 shows how the heat engine stop criterion changes as a function of the state of charge of the electrical energy storage means.

FIG. 8 shows a graph of the criterion C, expressed in grams per second (g/s) on a coordinate system in which the gain G is shown on the ordinate in grams per second (g/s) and the state of charge of the battery is on the abscissa, expressed as a percentage.

In this representation, the criterion C, shown by a dashed line, can be broken down into two successive parts: a first part in which the criterion C is zero up to the set high boundary SOCmax, and a second part in which the criterion C is a set decreasing function of the state of charge of the battery C=f (SOC).

The so-called pure electric drive zone is represented in the figure by a shaded area; it is bounded by the criterion C.

To illustrate the principle, going back to a practical non-limiting example: Assume that during a period T−1 (100 seconds), the vehicle recovers some quantity of energy that increases the battery charge level. Then, during a period T (100 seconds), the vehicle is traveling at a speed of 50 km/h on a gentle slope. Lastly, the vehicle is traveling at a constant speed of 100 km/h during the period T+1 (100 seconds). The question is whether or not to stop the heat engine during the period T.

a) If the heat engine is not turned off during the period T, the energy stored in the battery is used to assist the heat engine during periods T and T+1.

b) If the heat engine is turned off during the period T, the fuel consumption of the vehicle is zero during this period, and drive power is provided by the energy stored in the battery. During the period T+1, the electric machine is not used and the vehicle fuel consumption is the same as that of a conventional vehicle.

When comparing these two cases a) and b), we observe a fuel consumption gain when the heat engine is turned off during the period T. This is true even when the gain G calculated for the driving conditions in period T is close to zero and negative.

Actually, when the state of charge of the battery is very high (at the beginning of the period T), the heat engine stop criterion C becomes negative (cf. FIG. 8). Thus, for the driving situation in period T, the control means will turn the heat engine off.

With the method according to the invention, we have thus demonstrated that it is more advantageous to turn the engine off when the battery charge level is high (due to the energy recovered), even if the gain G is calculated as zero or becomes negative.

Figure 9:
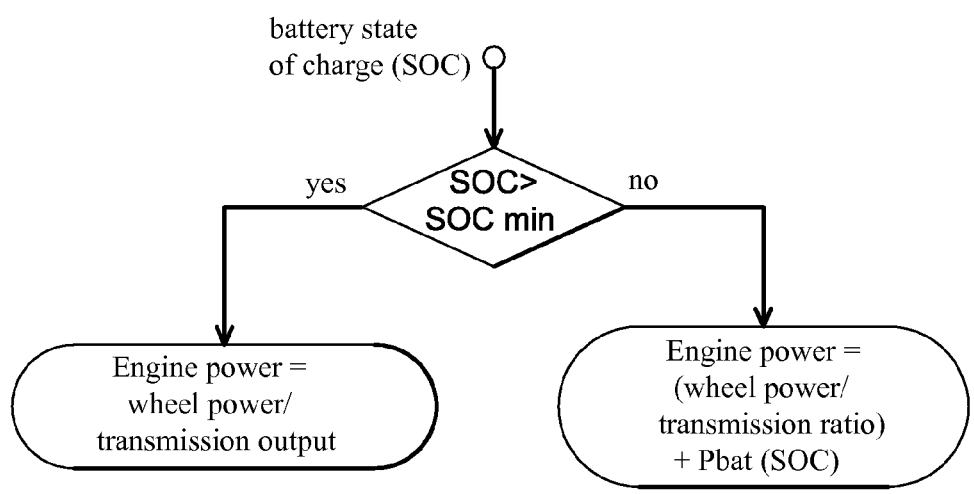
FIG. 9 shows a block diagram of the third step of the method according to the invention.
Figure 10A:
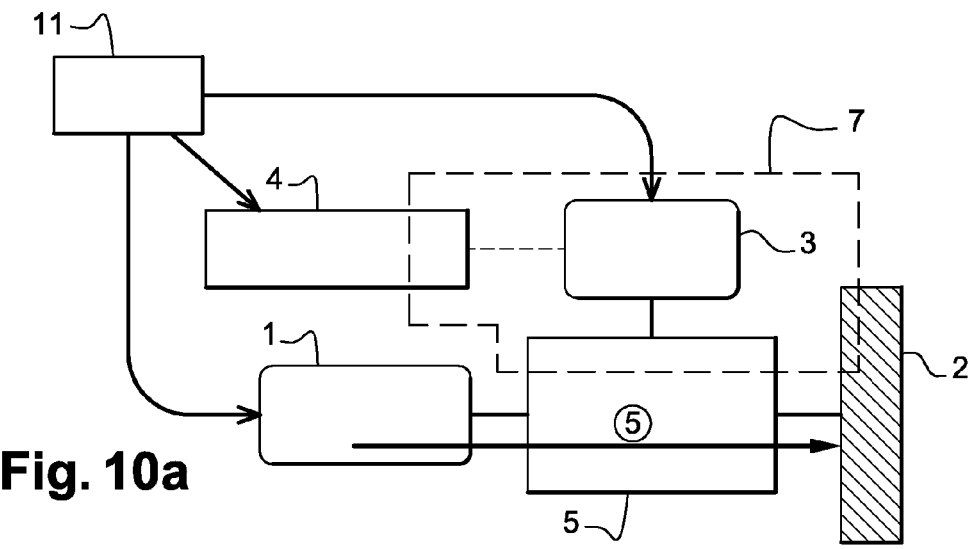
FIG. 10a shows the mechanical energy flow path with the heat engine turned on (path 5) for the third step of the method according to the invention.

In a third step 12, illustrated by the block diagram in FIG. 9, the method determines the engine power once the decision has been made to turn it on. The principle is to provide the power needed to just meet the demand for power at the wheel. FIG. 10a shows the flow path for the energy supplied by the heat engine directly to the wheels via the transmission means; the path is represented by a solid-line arrow (path 5).

Figure 10B:
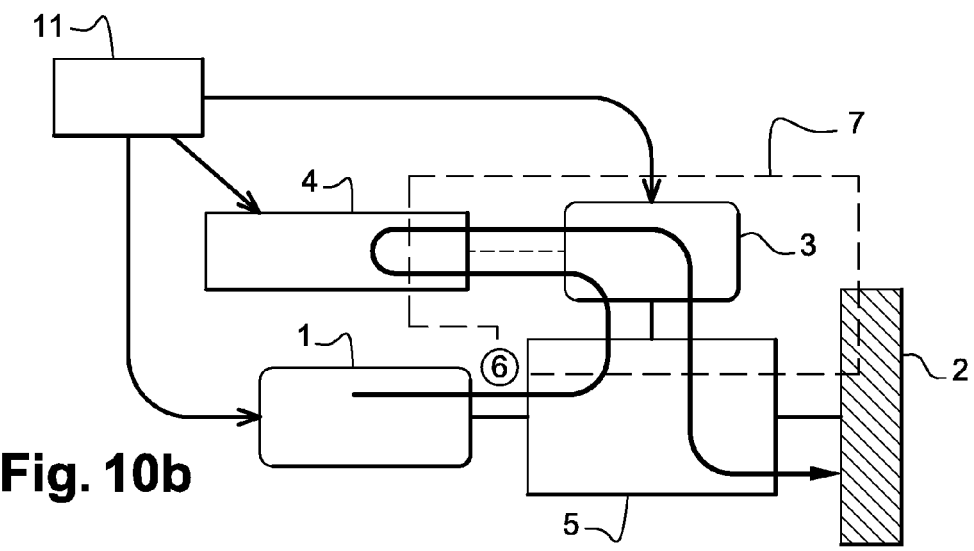
FIG. 10b shows the mechanical energy flow path with the use of the storage means (path 6) for the third step of the method according to the invention.

According to the hypothesis that a difference in the heat engine power is proportional to a difference in fuel consumption, using the battery with the heat engine on is a disadvantage for overall fuel consumption, since a difference in engine power at a given moment must be subsequently offset with the same power difference plus electrical losses. FIG. 10b shows the flow path for the energy supplied by the heat engine with the battery included; the path is represented by a solid-line arrow (path 6).

However, in a case where energy recovery by the recovery means is not adequate to fully power the heat engine stop phases in the pertinent ranges (those where the gain G is positive), the method is prompted to order the battery to recharge.

According to the invention, the method uses the state of charge of the battery in order to measure the level of energy recovery for the recovery means. In this way, when the battery charge is less than a set low boundary (SOCmin) of the battery's nominal operating range, the heat engine provides surplus power in order to recharge the battery and bring its charge back into the nominal range. Given that the losses in the electrical system and battery wear are proportional to the square of the power, the battery is recharged gradually until a set maximum state of charge is reached. In other words, the engine power is increased by a power Pbat, which decreases as a function of the state of charge.

Figure 11:
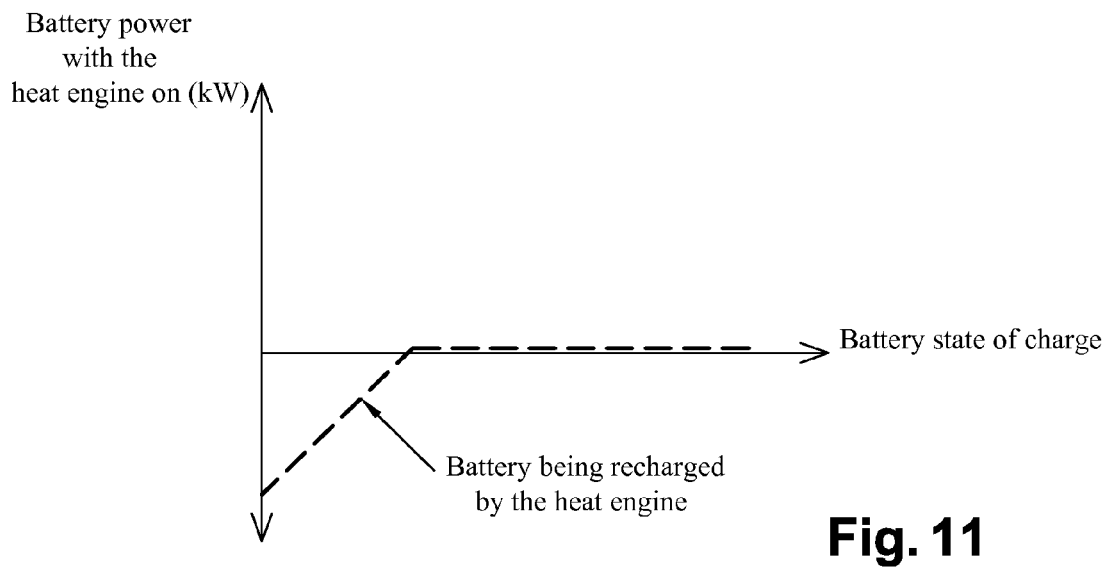
FIG. 11 shows how the power delivered by the electrical energy storage means with the heat engine turned on changes as a function of the state of charge of the storage means.

FIG. 11 illustrates the process of recharging the battery on a coordinate system in which the battery power with the heat engine on is shown on the ordinate in kilowatts (kW), and the state of charge of the battery is on the abscissa, shown as a percentage.

To give another illustration of the principle, assume, for example, that during a period T (100 seconds), the vehicle is traveling at a speed of 100 km/h with the heat engine on. During a period T+1 (100 seconds), the vehicle is still traveling at 100 km/h with the heat engine on. The question is whether or not to use the electric machine during the period T.

a) If the electric machine is not used during the period T, fuel consumption is the same as that of a conventional vehicle.

b) If the electric machine is used during the period T to assist the heat engine, the batteries discharge, and they will have to be recharged during the period T+1.

When comparing the two cases a) and b), we observe that fuel consumption is worse when the electric machine is used during the period T.

With the method according to the invention, we have thus demonstrated that use of the electric machine should be avoided when the heat engine is on (if the state of charge of the battery permits).

The main principles used by the method according to the invention are simple, based on physical approximations, and not on results from complex methods of optimization. Moreover, the method is easily transferable to new applications.

The method is simple compared to methods currently used in hybrid vehicle prototypes, and the power needed for onboard calculators is thereby reduced.

The invention claimed is:

1. Energy management method for a hybrid vehicle drive system, comprising a heat engine supplying mechanical energy to the vehicle wheels, at least one electric machine supplying electrical energy to the vehicle wheels, means for recovering electrical energy, means for storing electrical energy, and means for transmitting mechanical and electrical energy to the vehicle wheels, comprising:

in a first step, determining a fuel consumption gain (G) of the heat engine in real time by figuring the difference between a fuel consumption with the heat engine on and an equivalent consumption with the engine off, independently of other sources of energy outside the heat engine, the equivalent consumption being calculated from a set coefficient (K) corresponding to a ratio between a difference in fuel consumption and a difference in engine power for a set engine speed;

in a second step, deciding to turn the heat engine on or off based on a comparison between a criterion (C) and the consumption gain (G), wherein the criterion (C) is dependent on a level of energy recovery of the electrical energy recovery means, and determined in such a way as to increase the use of the electrical energy storage means and turn off the heat engine as often as possible, wherein the consumption gain (G) is expressed by the following formula:

$$G=[Pmth \cdot K+b(Nmth)]-[Pmth \cdot K/\eta elec^2]$$

where:
Pmth=power provided by the heat engine
K=proportionality coefficient
Nmth=engine speed
b=the part of fuel consumption that is solely dependent on the engine speed Nmth
$\eta$elec=electrical system efficiency.

2. Method according to claim 1, wherein the criterion (C) is set with a value of zero when the state of charge of the electrical energy storage means is less than a set maximum state of charge (SOCmax).

3. Method according to claim 2, comprising turning the heat engine off when the criterion (C) is zero and the consumption gain (G) is greater than the criterion (C).

4. Method according to claim 1, wherein the criterion (C) is set with a value which is negative and which is a decreasing function of the state of charge of the storage means when the state of charge of the electrical energy storage means is greater than a set maximum state of charge (SOCmax).

5. Method according to claim 4, comprising turning the heat engine off when the criterion (C) is negative and the consumption gain (G) is greater than the criterion (C).

6. Method according to claim 5, comprising, in an additional third step, using the state of charge of the electrical energy storage means to determine the heat engine power level needed to just meet the demand for power at the wheel.

7. Method according to claim 6, comprising, when the state of charge (SOC) of the energy storage means is less than a set minimum threshold (SOCmin), controlling the heat engine so that it provides surplus mechanical power in order to recharge the electrical energy storage means via the electric machine in order to restore the state of charge to a level greater than the minimum threshold (SOCmin).

8. Hybrid vehicle comprising a drive system comprising a heat engine supplying mechanical energy to the vehicle wheels, at least one electric machine supplying electrical energy to the vehicle wheels, means for recovering electrical energy, means for storing electrical energy, and means for transmitting mechanical and electrical energy to the vehicle wheels, and control means implementing the method according to claim 1.

9. Energy management method for a hybrid vehicle drive system, comprising a heat engine supplying mechanical energy to the vehicle wheels, at least one electric machine supplying electrical energy to the vehicle wheels, means for recovering electrical energy, means for storing electrical energy, and means for transmitting mechanical and electrical energy to the vehicle wheels, comprising:

in a first step, determining a fuel consumption gain (G) of the heat engine in real time by figuring the difference between a fuel consumption with the heat engine on and an equivalent consumption with the engine off, independently of other sources of energy outside the heat engine, the equivalent consumption being calculated from a set coefficient (K) corresponding to a ratio between a difference in fuel consumption and a difference in engine power for a set engine speed;

in a second step, deciding to turn the heat engine on or off based on a comparison between a criterion (C) and the consumption gain (G), wherein the criterion (C) is dependent on a level of energy recovery of the electrical energy recovery means, and determined in such a way as to increase the use of the electrical energy storage means and turn off the heat engine as often as possible, wherein the criterion (C) is set with a value of zero when the state of charge of the electrical energy storage means is less than a set maximum state of charge (SOCmax), said second step comprising turning the heat engine off when the criterion (C) is zero and the consumption gain (G) is greater than the criterion (C).

10. Energy management method for a hybrid vehicle drive system, comprising a heat engine supplying mechanical energy to the vehicle wheels, at least one electric machine supplying electrical energy to the vehicle wheels, means for recovering electrical energy, means for storing electrical energy, and means for transmitting mechanical and electrical energy to the vehicle wheels, comprising:

in a first step, determining a fuel consumption gain (G) of the heat engine in real time by figuring the difference between a fuel consumption with the heat engine on and an equivalent consumption with the engine off, independently of other sources of energy outside the heat engine, the equivalent consumption being calculated from a set coefficient (K) corresponding to a ratio between a difference in fuel consumption and a difference in engine power for a set engine speed;

in a second step, deciding to turn the heat engine on or off based on a comparison between a criterion (C) and the consumption gain (G), wherein the criterion (C) is dependent on a level of energy recovery of the electrical energy recovery means, and determined in such a way as to increase the use of the electrical energy storage means and turn off the heat engine as often as possible, wherein the criterion (C) is set with a value which is negative and which is a decreasing function of the state of charge of the storage means when the state of charge of the electrical energy storage means is greater than a set maximum state of charge (SOCmax), said second step comprising turning the heat engine off when the criterion (C) is negative and the consumption gain (G) is greater than the criterion (C).

11. Method according to claim 10, comprising, in an additional third step, using the state of charge of the electrical energy storage means to determine the heat engine power level needed to just meet the demand for power at the wheel.

12. Method according to claim 11, comprising, when the state of charge (SOC) of the energy storage means is less than a set minimum threshold (SOCmin), controlling the heat engine so that it provides surplus mechanical power in order to recharge the electrical energy storage means via the electric machine in order to restore the state of charge to a level greater than the minimum threshold (SOCmin).

* * * * *